(12) United States Patent
Kawakami et al.

(10) Patent No.: US 6,249,877 B1
(45) Date of Patent: Jun. 19, 2001

(54) METHOD AND APPARATUS FOR RECOVERING DATA FOR A FILE IN A PLURALITY OF EQUIPMENTS

(75) Inventors: Setsuo Kawakami, Hitachi; Minoru Koizumi; Kinji Mori, both of Yokohama; Kozo Nakai, Katsuta; Hirokazu Kasashima, Hitachi; Yasuo Suzuki, Ebina; Katsumi Kawano, Fuchu; Masayuki Orimo, Machida, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 07/344,448

(22) Filed: Apr. 28, 1989

Related U.S. Application Data

(63) Continuation of application No. 06/924,789, filed on Oct. 30, 1986, now abandoned.

(30) Foreign Application Priority Data

Oct. 30, 1985 (JP) .................................................. 60-241416

(51) Int. Cl.$^7$ .................................................... G06F 11/00
(52) U.S. Cl. .................................................... 714/6; 714/15
(58) Field of Search ........................ 364/200 MS File, 364/900 MS File; 395/600; 714/6, 15

(56) References Cited

U.S. PATENT DOCUMENTS

| | | | | |
|---|---|---|---|---|
| 3,681,762 | * | 8/1972 | Minshull et al. | 364/200 |
| 3,898,373 | * | 8/1975 | Walsh | 364/200 |
| 4,327,407 | * | 4/1982 | Burrows | 364/200 |
| 4,354,229 | * | 10/1982 | Davis et al. | 364/200 |
| 4,356,546 | * | 10/1982 | Whiteside | 364/200 |
| 4,432,057 | * | 2/1984 | Daniell | 364/200 |
| 4,442,502 | * | 4/1984 | Friend | 364/900 |
| 4,477,881 | * | 10/1984 | Kobayashi | 364/900 |
| 4,491,944 | * | 1/1985 | Caizergues et al. | 370/58 |
| 4,503,535 | * | 3/1985 | Budde | 364/200 |
| 4,510,594 | * | 4/1985 | Johnson, Jr. | 370/60 |
| 4,546,351 | * | 10/1985 | Nambu | 340/825.5 |
| 4,570,261 | * | 2/1986 | Maher | 364/200 |
| 4,635,189 | * | 1/1987 | Kendall | 364/200 |
| 4,665,520 | * | 5/1987 | Strom | 364/200 |
| 4,710,926 | * | 12/1987 | Brown | 371/9.1 |
| 4,794,519 | * | 12/1988 | Koizumi | 364/200 |
| 4,800,488 | * | 1/1989 | Agrawal | 364/200 |
| 4,803,614 | * | 2/1989 | Banba | 364/200 |
| 4,827,399 | * | 5/1989 | Shibayama | 364/200 |
| 4,851,988 | * | 7/1989 | Trottier | 364/200 |
| 4,872,165 | * | 10/1989 | Mori | 364/200 |
| 5,014,192 | * | 5/1991 | Mansfield | 395/600 |

\* cited by examiner

Primary Examiner—Eric Coleman
(74) Attorney, Agent, or Firm—Antonelli, Terry, Stout & Kraus, LLP

(57) ABSTRACT

According to the present invention, a file recovery system is provided in which the commands for recovering files such as a historical file are unnecessitated and the recovery system configuration is independent of the host processing system. That is, since the equipment for achieving a file recovery does not have information about the location of the recovery data, information about the content of a file to be recovered is transmitted to a transmission line. The other equipments asynchronously receive the information and judges whether or not a file containing the same content exists in the own system. If its file exists, the content of the file is transmitted to the transmission line. The equipment achieving the file recovery asynchronously receives from the transmission line the file data of files such as a historical file and establishes data consistency by use of the buffered current data and the event number, thereby recovering files such as a historical file.

19 Claims, 9 Drawing Sheets

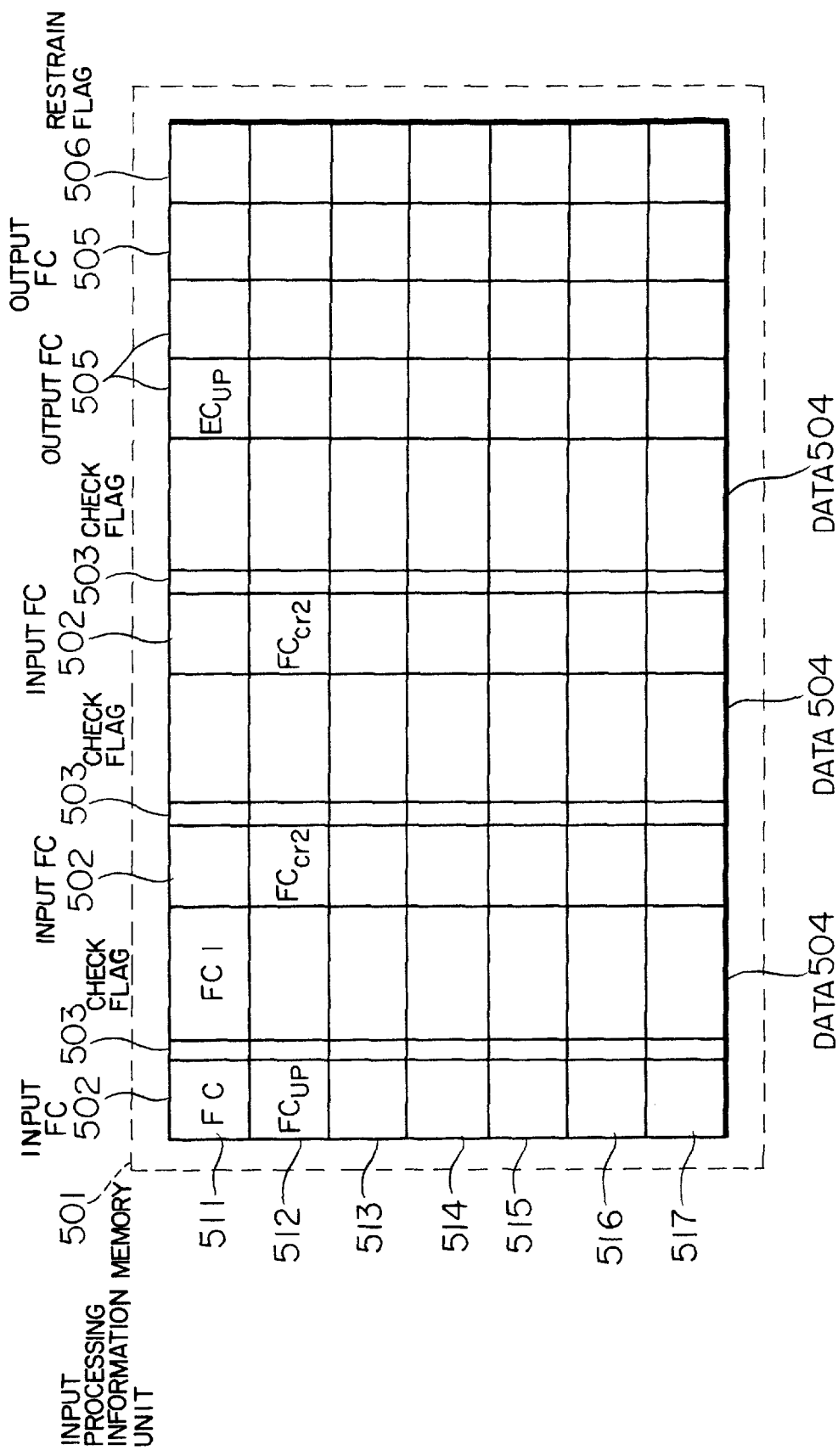

METHOD AND APPARATUS FOR RECOVERING DATA FOR A FILE IN A PLURALITY OF EQUIPMENTS

This application is a Continuation of application Ser. No. 06/924,789, filed Oct. 30, 1986 now abandoned.

BACKGROUND OF THE INVENTION

The present invention relates to a file recovery for a recovery system of files such as a historical file distributed to plurality of equipments connected to a common signal transmission line, and in particular, to a method and apparatus for distributed file recovery suitable for a system in which a file may possibly be destroyed and location of file recovery data cannot be determined.

In the conventional file system, although a plurality of files are distributed as described in a manual of a large-sized computer, the processing between files is controlled by a host computer in a concentrated fashion, and hence a command error may occur during a file recovery and the contents of a file thus recovered become different from the expected correct data; moreover, during the file recovery, the processing other than the recovery processing is prevented from being executed, which leads to a disadvantage that the processing efficiency of the system as a whole is lowered.

SUMMARY OF THE INVENTION

It is therefore an object of the present invention to provide a method of distributed file recovery which is capable of effecting a file recovery even if the location of the file recovery data of a historical file or the like is not known and which is capable of simultaneously accomplishing operations of other equipments while executing the historical file recovery. To this end, according to the present invention, there is provided a method of distributed file recovery in a distributed file system comprising a plurality of equipment connected to a common signal transmission path a plurality of files each containing data of the same content stored in a sequence characterized in that an equipment for achieving a file recovery transmits to a transmission path a file information having contents for the file recovery and each equipment having received the file information judges whether or not its own file includes data of the same contents, and if the data is included, the equipment transmits the data to the transmission path; equipment for effecting a file recovery judges a current data necessary for the recovery and receives the necessary current data from the transmission path and each data format is provided with an information required, when generating a recovery data from the current data and the transmitted data, to keep a data consistency with respect to the other files; and the equipment executes the file recovery based on the information.

BRIEF DESCRIPTION OF THE DRAWINGS

The present invention will be apparent from the following detailed description taken in conjunction with the accompanying drawings in which:

FIG. 5 is a configuration diagram of an input processing information memory unit according to the present invention;

DESCRIPTION OF THE PREFERRED EMBODIMENTS

Description will be given of an embodiment of the present invention with reference to the accompanying drawings.

Figure 1:
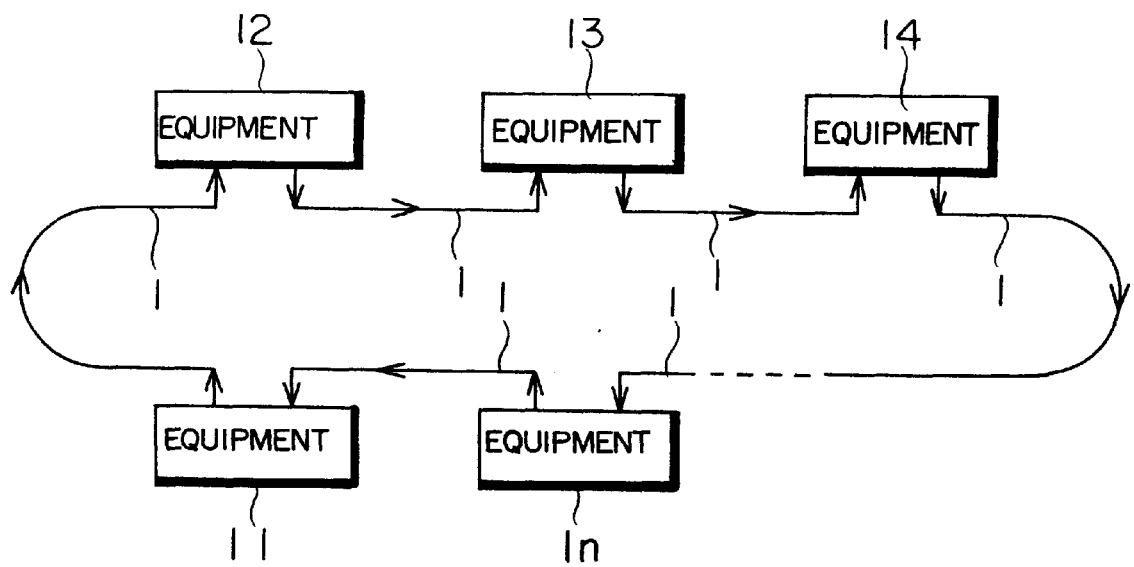
FIG. 1 is a schematic diagram illustrating an example of the overall configuration of a system having a loop transmission system and n equipments connected thereto.

FIG. 1 is a schematic diagram showing the overall configuration of the present invention.

A loop transmission system of FIG. 1 comprises a one directional transmission loop 1 forming a common signal transmission path or line to which n equipments 11, 12, . . . , 1n are connected.

Figure 2:
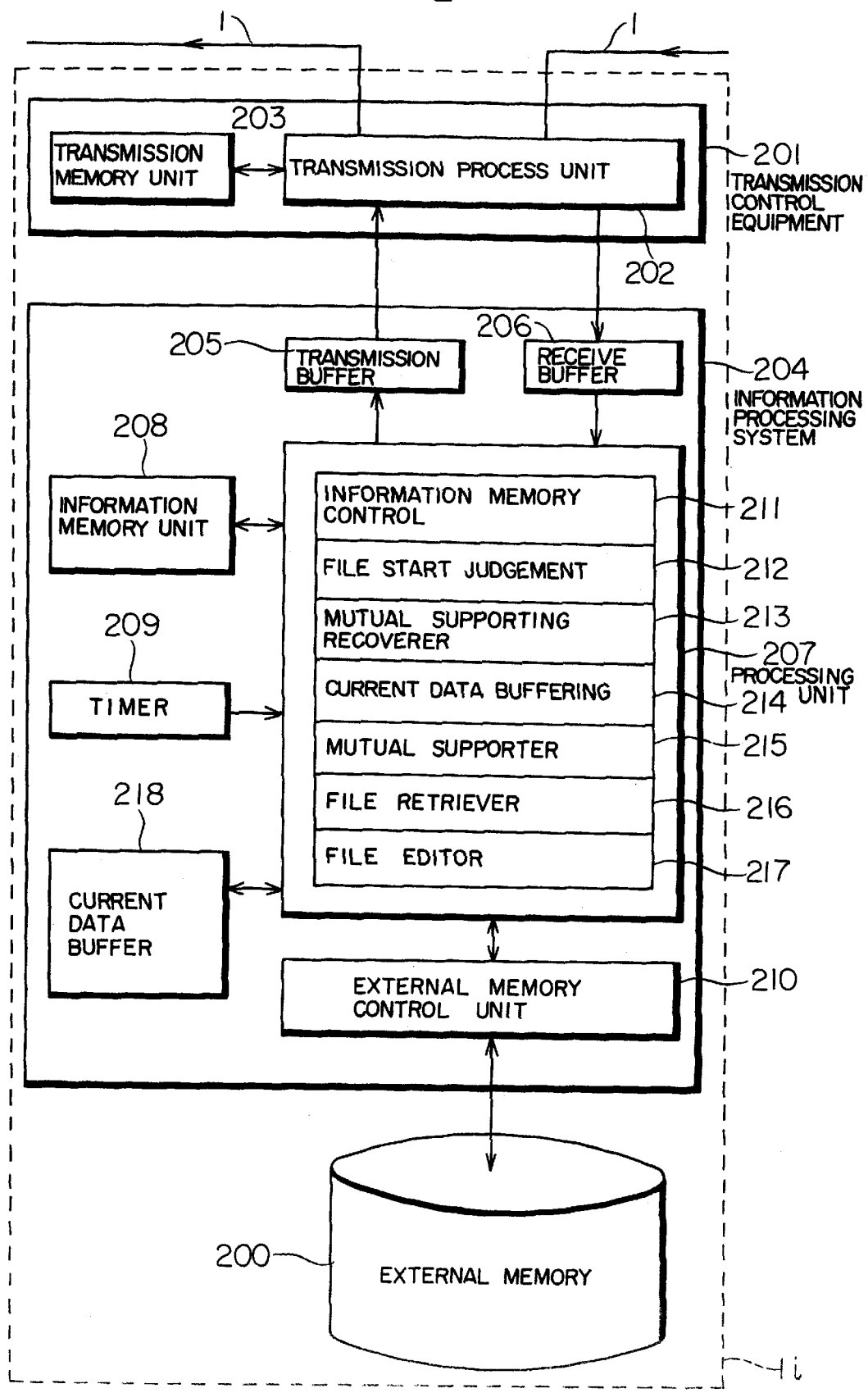
FIG. 2 is a schematic block diagram of an equipment which may be used in the system according to the present invention.

FIG. 2 is a schematic diagram illustrating the configuration of an i-th equipment 1$i$. The equipment li comprises an external memory 200 and processes, by use of an information processing system 204, data received via a transmission control equipment 201 and a transmission line 1, and then the data is stored in the external memory 200. Data stored in the external memory 200 may also be accessed and processed by the information processing system 204, and thereafter the result is transmitted via the transmission control equipment 201 to the transmission line 1.

Next, description will be given of the transmission control equipment 201 and the information processing system 204 in this sequence.

Figure 3:
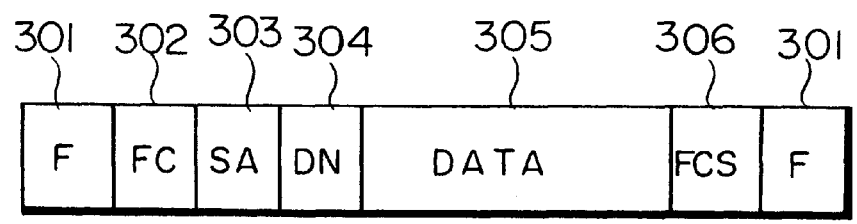
FIG. 3 is a configuration diagram illustrating the format of data on a transmission line.

First, the transmission control equipment 201 comprises a transmission process unit 202 and a transmission memory unit 203. FIG. 3 is a schematic diagram illustrating the format of data received by the transmission control equipment 201 via the transmission line 1. This format includes a flag 301 indicating the beginning or the end of the transmission line data, a content code 302 assigned corresponding to the content of data, an address field 303 indicating an address of an equipment that has transmitted the data, a data length field 304 containing the data length, a data field 305 containing the data, and a frame check sequence field 306 containing a frame check sequence for checking a transmission error.

Figure 4:
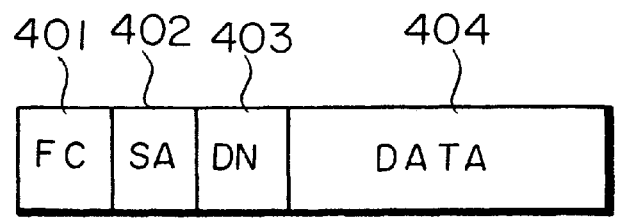
FIG. 4 is a configuration format illustrating the format of an input data to a receive buffer 206.

When the transmission process unit 202, for which a content code corresponding to the data to be received by the equipment 1$i$ is registered in the transmission memory unit 203, receives data from the transmission line 1, the transmission process unit 202 checks the content code 302 of the transmission line data and determines whether or not the same content code has been registered in the transmission memory unit 203. If this is the case, the data is transmitted to the information processing system 204; otherwise, the received transmission line data is transferred to the linked transmission line 1. FIG. 4 is a schematic diagram illustrating the format of data passed from the transmission process unit 202 to the information processing system 204. The format comprises a content code 401, a source address of data transmission 402, a data length 403, and data 404.

Next, the information processing system 204 will be described.

Figure 6:
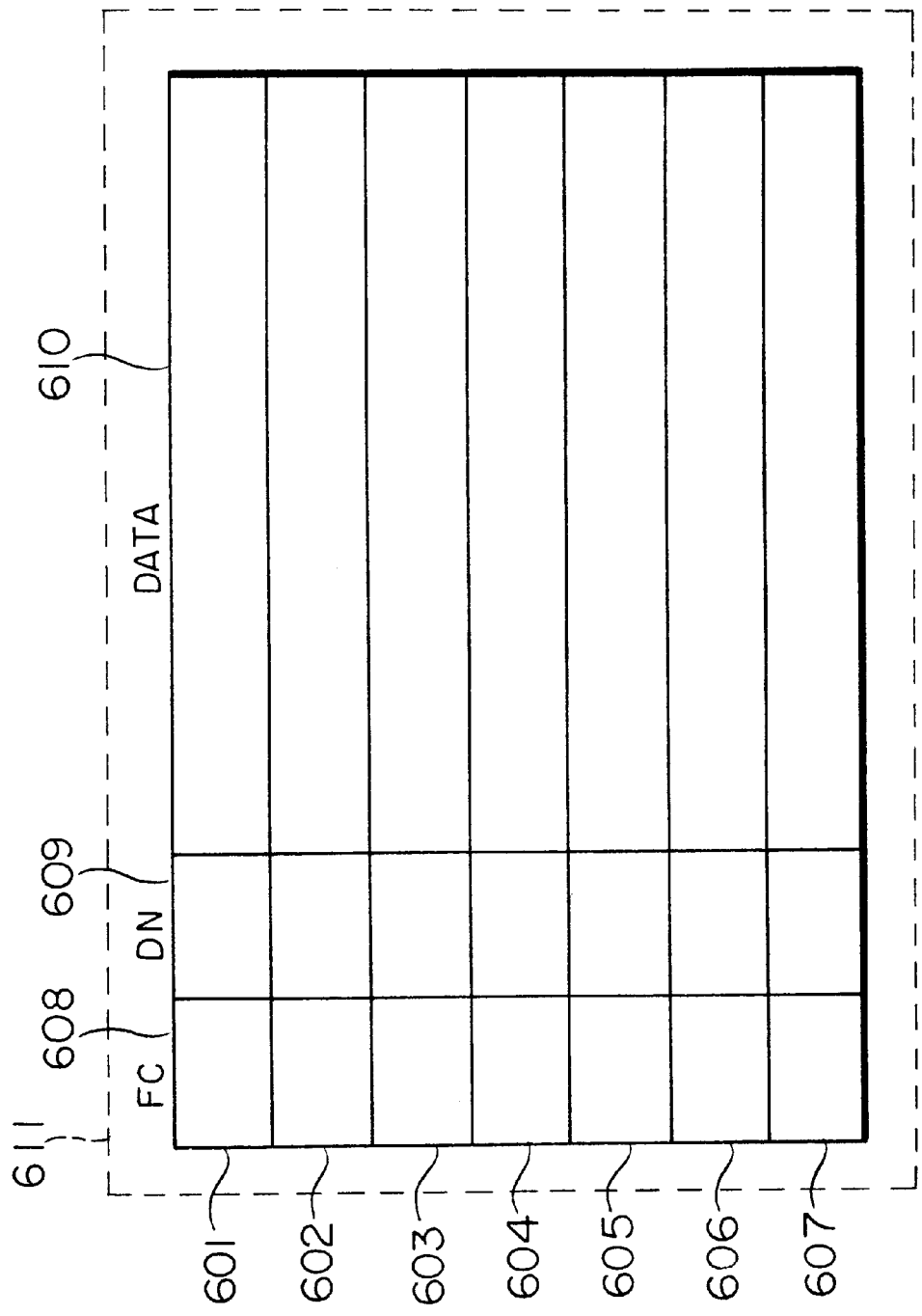
FIG. 6 is a configuration diagram of an output processing information memory unit according to the present invention.

The information processing system 204 includes a transmission buffer 205 and a receive buffer 206 for storing the transmitted and received data, respectively, a processing unit 207 for temporarily processing information, an information memory unit 208 for storing information about the data to be processed by the processing unit 207, a timer 209, an external memory control unit 210 for controlling the data communication with respect to the external memory 200, and a buffer 218 for the current data. The processing unit 207 is further divided into processing sections including an information memory control 211, a file start judgment 212, a mutual supporting recoverer 213, a current data buffering 214, a mutual supporter 215, a file retriever 216, and a file editor 217. The mutual supporter 215, the file retriever 216, and the file editor 217 are processing sections collectively called a file module. Since each processing section operates in a data driven manner with reference to the information memory unit 208, the information memory unit 208 will be first described prior to explanation of the processing unit 207. The information memory unit 208 comprises an input processing information memory unit 501 (FIG. 5) and an output processing information unit 611 (FIG. 6). The input processing information memory unit 501 includes processing data information areas, namely, cells 511–517 corresponding to the processing sections 211–217, respectively. Each cell of the cells 511–517 further comprises an input content code area 502 for indicating a content code of input data input to the processing section, a check flag area 503 for indicating the presence/absence of the input data, an input data output area 504, an output content code area 505 for indicating a content code of an output data from the processing section, and a restrain flag 506 for indicating whether or not a processing section can be started. The above-mentioned content code is a code that is assigned in accordance with the meaning of the data to be set in the field 505. The output processing information memory unit 611 includes processing data information areas, namely, cells 601–607 corresponding to the processing sections 211–217, respectively as shown in FIG. 6. Each cell of the cells 601–607 comprises an output content code area 608 for indicating a content code of output data, a data length area 609, and an output data area 610.

Figure 7:
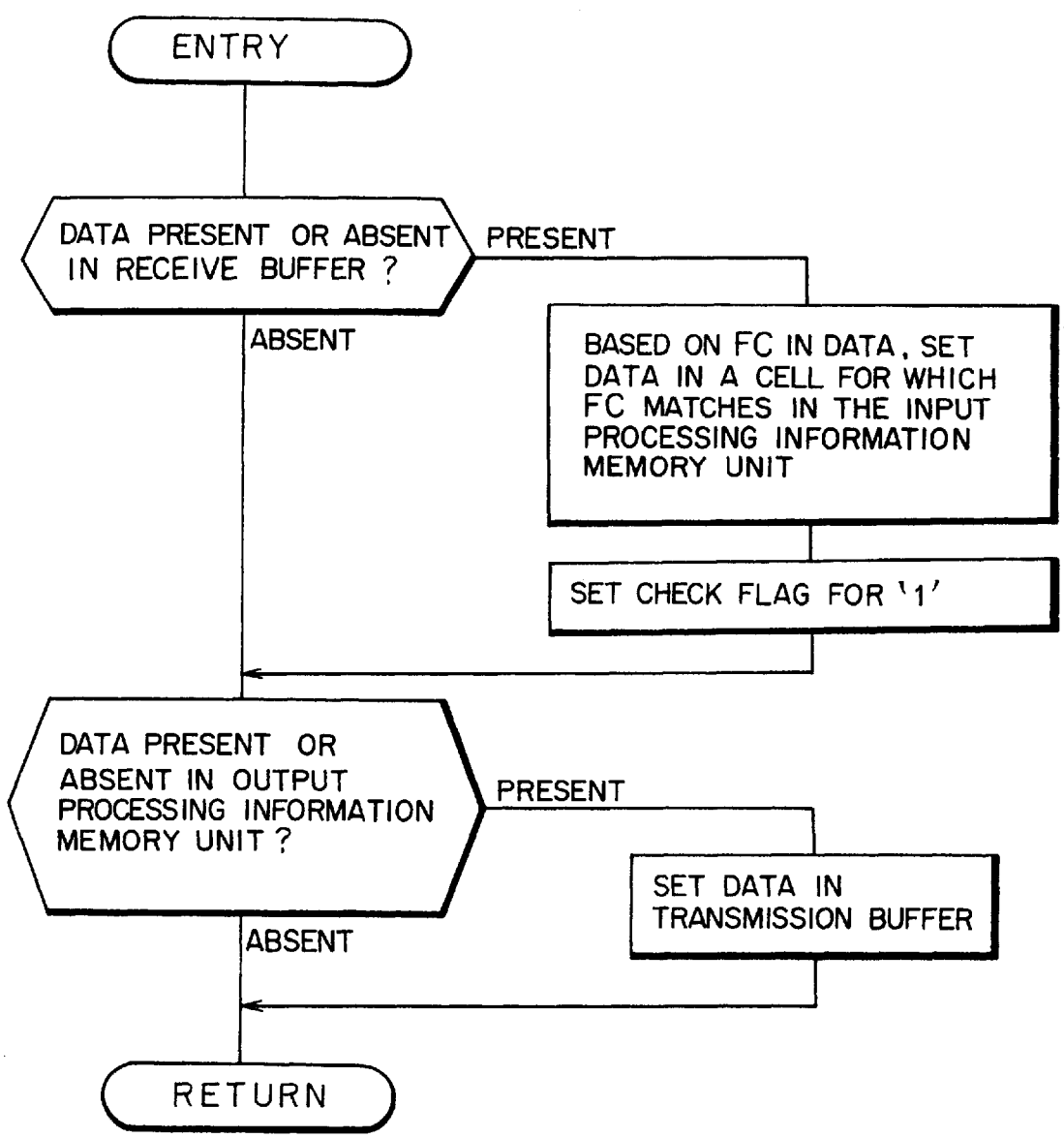
FIG. 7 is a flowchart demonstrating an operation flow of the information memory unit control according to the present invention.
Figure 8:
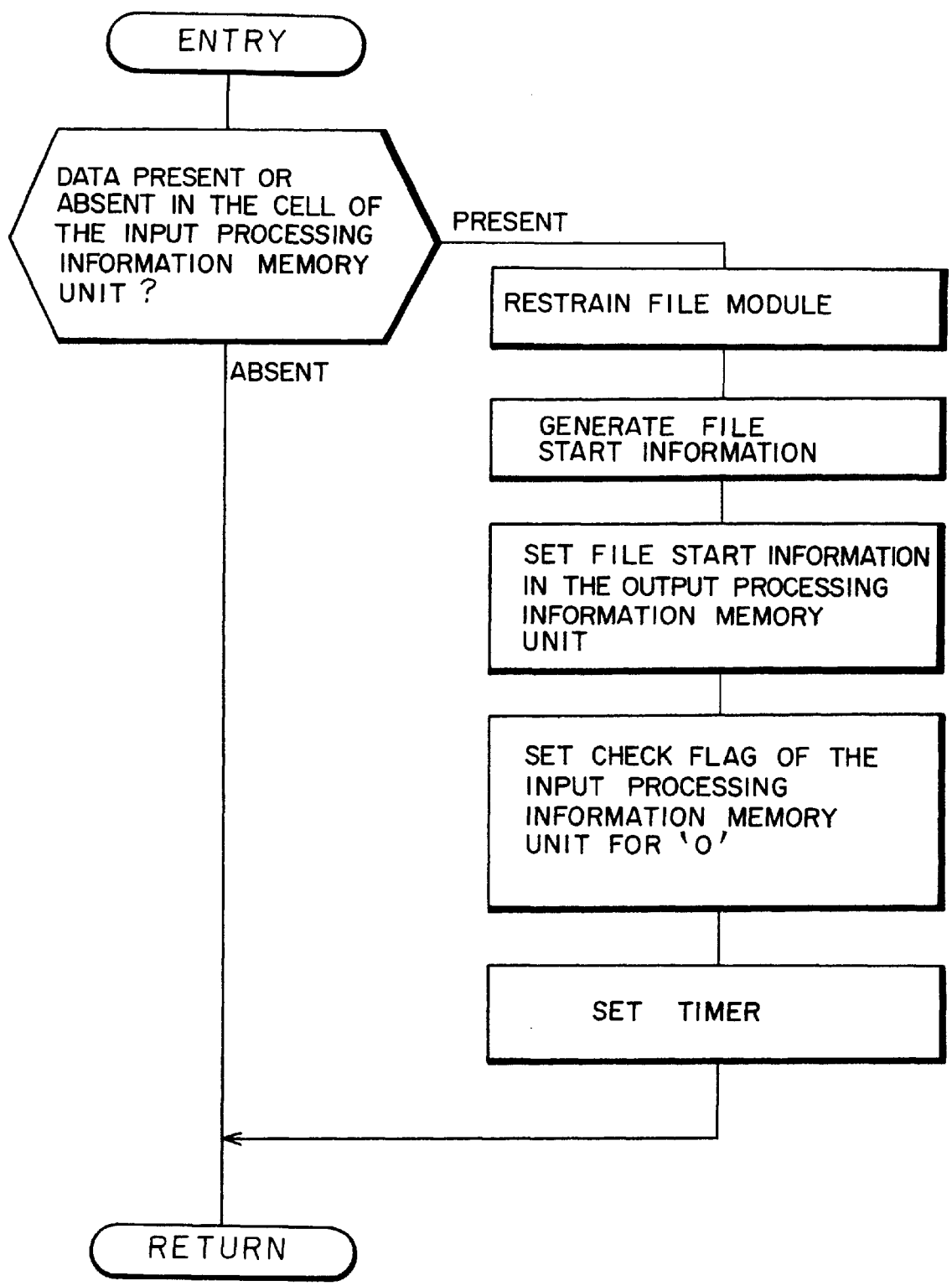
FIG. 8 is a flowchart illustrating an operation flow of the file start judgment according to the present invention.
Figure 9:
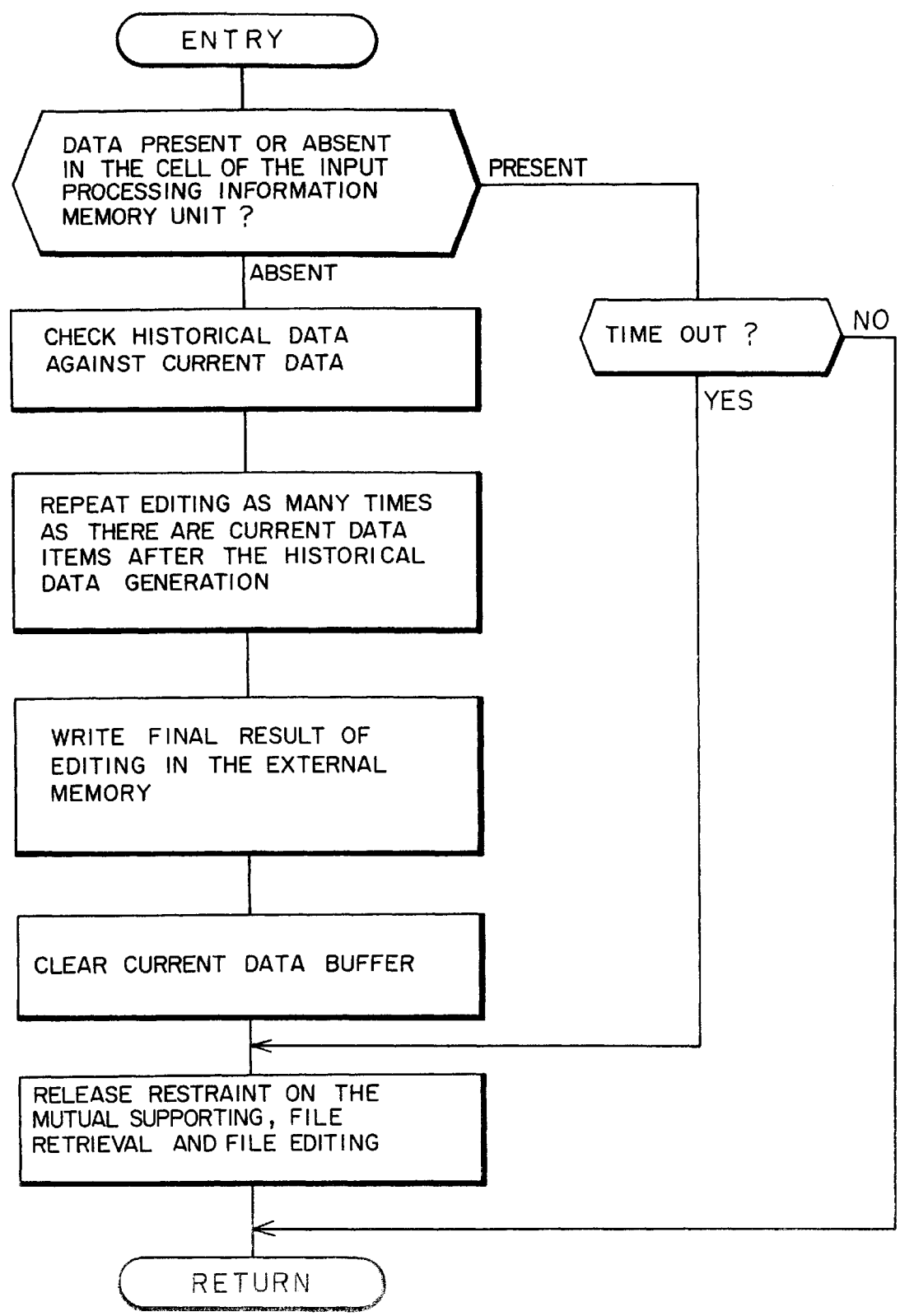
FIG. 9 is a flowchart illustrating an operation flow of the mutual supporting recover according to the present invention.

As for the operation of the processing unit 207, the processing sections thereof may be activated in an arbitrary order; however, in this description, the processing sections are assumed to be activated in the order of the information memory unit control 211, the file start judgment 212, the mutual supporting recoverer 213, the current data buffering 214, the mutual supporter 215, the file retriever 216, and the file editor 217. First, when the information memory unit control 211 is operated (the flowchart shown in FIG. 7), it is checked whether or not the receive buffer 206 contains data. If there exists data in the receive buffer 206, a data item having the format of FIG. 4 is set in the information memory unit 208. More specifically, the content code registered in the input content code area 502 is checked against the content code of the data in the receive buffer 206. For any data for which the content code matches, data items (the transmission source address 402, the data length 403, and the data 404) are set in the input data area 504 and "1" is stored in the check flag area 503. If data is missing in the receive buffer, the information memory unit control 211 does not take any action. Next, the file start judgment 212 starts its operation (flow-chart shown in FIG. 8). The file start information contains as the data thereof a content code corresponding to the data stored as a file in the external memory 200. The file start information is set in the input processing information memory unit 501 during the initial processing at the startup of the equipment 1i; alternatively, based on the data received from the transmission line 1, the information memory unit control 211 sets the file start information in the input processing information memory unit 501. If the file start information is found to be missing as a result of the file start information presence/absence check, no action is taken; otherwise, the restrain flag 506 is set for "1" for the mutual supporter 215, the file retriever 216, and the file editor 217, thereby restraining the execution of these three processing sections until the file recovery is completed. The file start judgment 212 sets the data containing the file start information as its substantial data in the output processing information memory unit 611. The file start information code is set in the output content code area 608. The processing of the file start judgment 212 has been described. Next, the mutual supporting recoverer 213 is activated (the flowchart shown in FIG. 9). In the input content code area 502 of the cell 512 in the input processing information memory unit 501 corresponding to the mutual supporting recoverer 213, the content code associated with the contents of the chronological change file to be recovered and the content code of the file start information are registered in advance.

Figure 10:
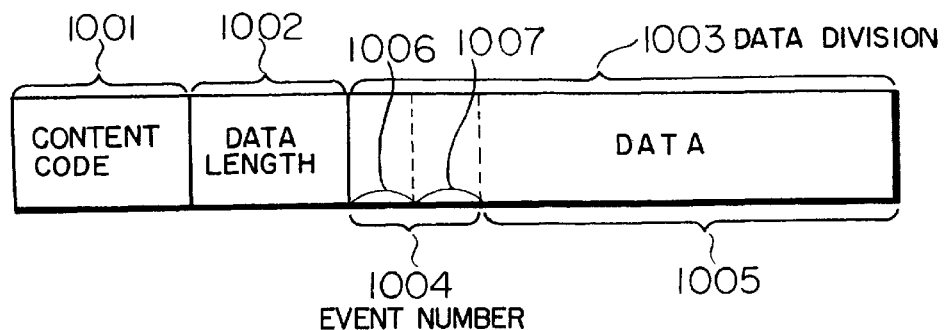
FIG. 10 is a schematic diagram showing the format of the historical data and the current data.

When the mutual supporting recoverer 213 is activated, the check flag area 503 is judged to determine whether or not all data registered in the cell 512 are present. If all data are present, the latest chronological change file data is edited by the use of the chronological change file data stored in the data area 504 of the cell 512 and the current data in the current data buffer 218, and then the resultant data is stored in the external memory 200 via the external memory control unit 210. The current data buffer 218 is then cleared and the restrain flag 506 is released for the mutual supporter 215, file retriever 216, and the file editor 217 to be described later, thereby completing the processing of the mutual supporting recoverer 213. Moreover, the chronological change data is edited as follows. First, the buffered current data is checked against the chronological change data to determine the new and old data. As shown in FIG. 10, the format of the current data and the chronological change data includes a content code field 1001, a data length field 1002, and a data field 1003. The data field 1003 is further divided into an event number field 1004 and a data field 1005. The event number includes a data transmission source address 1006 and a sequence number assigned by the data transmission source. The event number added to the chronological change data is made to be identical with the event number of the latest current data used to generate the chronological change data; consequently, by comparing the event numbers, the chronological change data can be determined whether or not to be older than the buffered current data. As a result, the current data generated after the chronological change data generation can be identified, and hence by editing the chronological change data by sequentially using the current data, the latest chronological change file data can be edited. If all data registered to the cell 512 are not present when the mutual supporting recoverer 213 is activated, a timer judgment is executed. That is, in a case of a timeout, it is assumed that the file recovery data is missing in the system and the restrain flag 506 is released for the mutual supporter 215, the file retriever 216, and the file editor 217, thereby completing the mutual supporting recoverer processing. If the timeout has not occurred, no special processing is accomplished, thereby completing the mutual supporting recovery processing.

Figure 11:
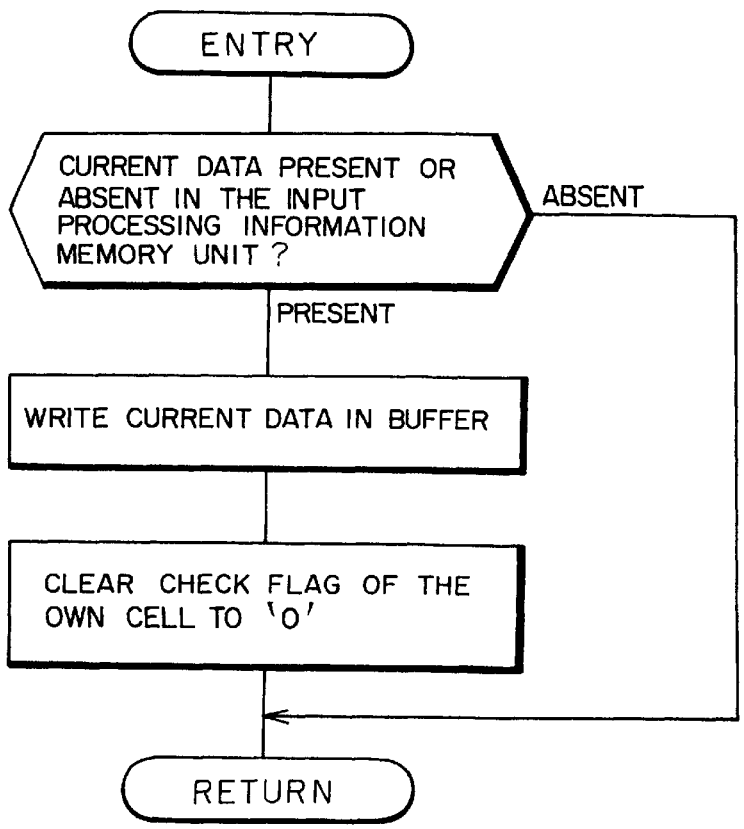
FIG. 11 is a flowchart showing an operation flow of the current data buffering of the present invention.

Next, the current data buffering 214 is activated (the flowchart shown in FIG. 11). To the input content code area 502 of the cell 513 in the input processing information memory unit 501 corresponding to the current data buffering 214, the content code of the current data used to edit the file is registered in advance. When the current data buffering 214 is activated, the check flag 503 of the pertinent cell 513 is checked to determine whether or not the current data has been set. If the current data has been set with the check flag="1", the current data stored in the data buffer 504 of the cell 513 is buffered into the current data buffer 218. The check flag area 503 of the cell 512 is then cleared to "0", thereby completing the buffering processing. If the current data has not been set, no special processing is executed, thereby completing the buffering processing.

Figure 12:
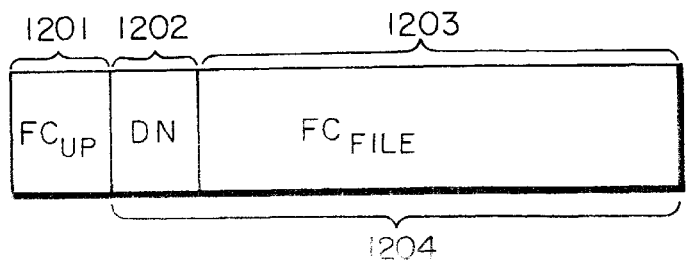
FIG. 12 is a schematic diagram illustrating the data format of the file start information according to the present invention.
Figure 13:
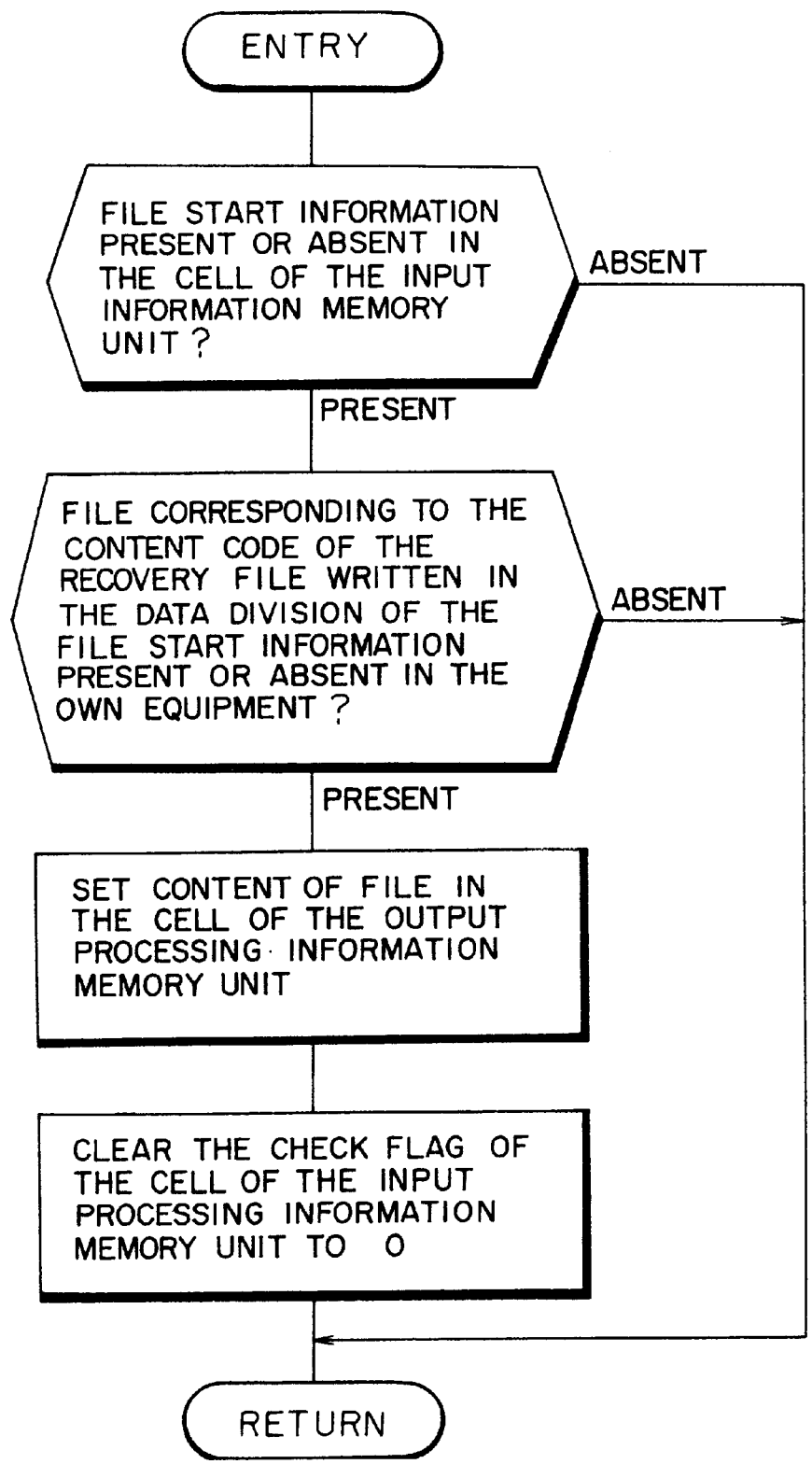
FIG. 13 is a flowchart showing an operation flow of the mutual supporter according to the present invention.

Next, the mutual supporter 215 is activated (the flowchart shown in FIG. 13). The mutual supporter 215 is activated when the file start information of FIG. 12 is present. That is, if the content code 1201 of the file start information has been registered to the input content code area 502 of the own cell 514 and the check flag 503 of the area corresponding to the file start information is "1", the data corresponding to the data division 1204 of the file start information is fetched from the input data area 504 for the processing. In the concrete processing, based on the data associated with the data 1203 of the file start information, the content code of the file to be recovered is checked to determine whether or not it matches with the content code of the file in the equipment thereof. The content code of the file in the equipment is beforehand registered to the output content code area 505 of the cell 514 in the input processing information memory unit 501. If the content codes match as a result of the check, the content of the file is read via the external memory control unit 210 and is set to the output data area 610 of the cell 604 in the output processing information memory unit 611, the output content code is set to the content code area 608, and the check flag 503 of the own cell 514 in the input processing information memory unit is cleared to "0", thereby completing the mutual supporting processing. If the content codes do not match as a result of the code check, the check flag 503 of the own cell 514 in the input processing information memory unit 501 is cleared to "0", thereby completing the processing of the mutual supporting recoverer 213.

Next, the file retriever 216 and the file editor 217 are activated in this order. The file retriever 216 and the file editor 217 are executed if the areas registered to the check flag areas 503 of the pertinent cells 515–516 in the input processing information memory unit 501 have been set to "1". More concretely, the file retriever 216 activates the external memory control unit 210, reads the content of the file, writes the obtained data in the output data area 610 of the cell 605 in the output processing information memory unit 611, and clears the check flag 503 of the cell 515 to "0". The file editor 217 fetches data from the input data area 504 of the cell 516, performs editing of the data, writes the resultant data in the external memory 200, and clears the check flag 503 of the cell 516 to "0", thereby completing the editing processing. However, if the restrain flag 506 of the cell 516 is "1", the write operation on the external memory 200 is not achieved. In the file retriever 216 and the file editor 217, if the areas registered to the check flag 503 are other than "1", no special processing is accomplished, thereby completing the file retriever and file editor processing.

Next, the information memory unit control 211 is activated so as to repeat the processing described above. As described above, by periodically activating the information memory unit control 211, the file start judgment 212, the mutual supporting recoverer 213, the current data buffering 214, the mutual supporter 215, the file retriever 216, and the file editor 217, each equipment can autonomously effect a recovery without necessitating information about the location where data for the chronological change file recovery exists in the system; moreover, the file editing can be achieved even during the chronological change file recovery.

Although the present invention has been described with reference to an embodiment of the chronological change file recovery method, it is not restricted by the embodiment, namely, the present invention is applicable to a case in general where the file configuration is determined according to the same idea and the data is edited according to the file configuration.

Although the embodiment includes a loop configuration as a common signal transmission line, the present invention can be widely applied to any common transmission lines of the bus type, star type, and network type; moreover, lines or paths of the radio transmission and the common transmission type (for the wire and radio transmission).

According to the present invention, for a file recovery of a chronological change file or the like, the location of the recovery data need not be known, and hence even if there exists an equipment which is executing a file recovery in the system, the other equipments need not change the operation mode, which facilitates the control. In an equipment which is executing a file recovery, file editing can also be achieved on current data concurrently with the file recovery, which leads to an effect that the file recovery is effected at a high speed.

What is claimed is:

1. A method for distributed file recovery in a distributed file system including a plurality of equipments connected to a transmission path, said method comprising the steps of:

sending data for a file to be recovered to said transmission path from at least one of said equipments in response to a file recovery message from an equipment other than said at least one of said equipments, said equipment other than said at least one of said equipments having stored therein said file to be recovered;

judging, in said equipment other than said at least one of said equipments, whether said data for said file to be recovered sent to said transmission path is related to a content of said file to be recovered;

receiving, from said transmission path in said equipment other than said at least one of said equipments, said data for said file to be recovered judged to be related to said content of said file to be recovered; and generating, in said equipment other than said at least one of said equipments, data of a recovered file on the basis of said data for said file to be recovered.

2. A method of distributed file recovery according to claim 1, wherein:

said equipment other than said at least one of said equipments, when file recovery is intended, sends said file recovery message containing information on said file to be recovered to said transmission path;

each equipment other than said equipment which transmitted said file recovery message, receives said file recovery message from said transmission path;

said each equipment judges whether data of said file to be recovered is included within a file stored in said each equipment on the basis of said file recovery message; and said each equipment retrieves said data for said file to be recovered from said file stored in said each equipment if said data for said file to be recovered is judged to be included within said file stored in said each equipment.

3. A method of distributed file recovery according to claim 1, wherein:

said at least one of said equipments when file recovery is intended sends said data for a file to be recovered with an identifier appended thereto indicating a content of said data for said file to be recovered to said transmission path.

4. A method for distributed file recovery in a distributed file system including a plurality of equipments connected by a transmission path, said method comprising the steps of:

sending data of a file to be recovered to said transmission path from at least one of said equipments in response to a file recovery message from an equipment other than said at least one of said equipments, said equipment other than said at least one of said equipments having stored therein said file to be recovered;

judging in said equipment other than said at least one of said equipments whether said data of said file to be recovered is related to a content of said file to be recovered;

receiving in said equipment other than said at least one of said equipments said data of said file to be recovered judged to be related to said content of said file to be recovered; and generating, in said equipment other than said at least one of said equipments, recovery data based on said data of said file to be recovered and current data generated by any one of said equipments.

5. A method for distributed file recovery according to claim 4, wherein said generating step includes the step of:

receiving in said equipment other than said at least one of said equipments said current data from said any one of said equipments.

6. A distributed file recovery apparatus including a plurality of equipments connected to a common transmission path for distributed file recovery, said apparatus comprising:

said plurality of equipments wherein each equipment includes:

means for sending data of a file to be recovered to said common transmission path in response to a file recovery message from an equipment other than said each equipment, said equipment other than said each equipment having stored therein said file to be recovered means for judging whether data of said file to be recovered and another data transmitted from another of said equipments are related to a content of a file to be recovered stored in said each equipment, means for receiving in said each equipment said data of said file to be recovered and said another data if said data of said file to be recovered and said another data are judged to be related to a content of said file to be recovered stored in said each equipment, and means for generating a recovered file by editing said another data from said another of said equipments and said data of said file to be recovered stored in said each equipment.

7. A distributed file recovery apparatus according to claim 6 wherein:

said each equipment sends as said file recovery message a message containing information of a file to be recovered;

said each equipment further includes:

means for receiving said file recovery message from said common transmission path, wherein said means for judging judges whether data of said file to be recovered is included within a file stored in said each equipment based on said file recovery message; and means for sending data of said file to be recovered to said common transmission path if said data of said file to be recovered is judged to be included within said file stored in said each equipment.

8. A distributed file recovery apparatus according to claim 6, wherein;

said each equipment sends as said data of a file to be recovered a file recovery message containing an identifer indicating a content of said data of said file to be recovered to said common transmission path.

9. A distributed file recovery apparatus including a plurality of equipments connected by a common transmission path for distributed file recovery, comprising:

said plurality of equipments wherein each equipment includes:

means for sending data of a file to be recovered to said common transmission path in response to a file recovery message from an equipment other than each equipment, said equipment other than said each equipment having stored therein said file to be recovered, means for judging whether data of a file to be recovered is related to a content of a file to be recovered stored in said each equipment, means for receiving said data of said file to be recovered when said data of said file to be recovered is related to said content of said file to be recovered stored in said each equipment, and means for generating recovery data based on said data of said file to be recovered and current data generated by another equipment.

10. A distributed file recovery apparatus according to claim 9, wherein said each equipment further includes means for receiving said current data from said another equipment.

11. A method for distributed file recovery in a distributed file system including a plurality of equipments connected to a transmission path, said method comprising the steps of:

sending a message having data for a file to be recovered to said transmission path from at least one of said equipments in response to a file recovery message from an equipment other than said at least one of said equipments, said equipment other than said at least one of said equipments having stored therein said file to be recovered;

judging, in said equipment other than said at least one of said equipments whether said message having data for said file to be recovered on said transmission path is related to a content of said file to be recovered stored therein;

receiving from said transmission path, in said equipment other than said at least one of said equipments, said message having said data for said file to be recovered judged to be related to said content of said file to be recovered; and generating, in said equipment other than said at least one of said equipments, data of a recovered file on the basis of said content of said file to be recovered and said data for said file to be recovered.

12. A method of distributed file recovery according to claim 11, wherein:

said equipment other than said at least one of said equipments sends as said file recovery message a message containing information on said file to be recovered;

each equipment receiving said file recovery message judges whether data for said file to be recovered is included within a file stored therein on the basis of said file recovery message; and said each equipment receiving said file recovery message sends data for said file to be recovered to said transmission path if said data for said file to be recovered is judged to be included within said stored file.

13. A distributed file recovery apparatus including a plurality of equipments connected to a common transmission path for distributed file recovery, said apparatus comprising:

said plurality of equipments wherein each equipment includes:

means for sending a message having data for a file to be recovered to said transmission path in response to a file recovery message from an equipment other than each equipment, said equipment other than each equipment having stored therein said file to be recovered, means for judging, whether said message having data for said file to be recovered on said transmission path, is related to a content of a file to be recovered stored therein, means for receiving from said transmission path said message having data for said file to be recovered judged to be related to a content of said file to be recovered stored in said each equipment, and means for generating, in said each equipment, data of a recovered file on the basis of said content of said file to be recovered stored in said each equipment and said message having data for said file to be recovered.

14. A distributed file recovery apparatus according to claim 13, wherein:

each equipment sends as said file recovery message a message containing information on said file to be recovered to said transmission path;

each equipment other than said equipment sending said file recovery message receives said file recovery message from said transmission path, said each equipment receiving said file recovery message judges whether data for said file to be recovered is judged to be included within a file stored therein on the basis of said file recovery message, and said each equipment receiving said file recovery message sends data for said file to be recovered to said transmission path if said data for said file to be recovered is included within said stored file.

15. A method for distributed file recovery in a distributed file system including a plurality of equipments connected to a transmission path, said method comprising the steps of:

sending a message for a file to be recovered to said transmission path from at least one of said equipments;

receiving, in each equipment other than said at least one of said equipments, said message for said file to be recovered from said transmission path;

judging, in said each equipment, whether or not a file corresponding to said file to be recovered is stored in the equipment;

sending, said file corresponding to said file to be recovered to said transmission path, if said file corresponding to said file to be recovered exists in the equipment;

receiving, in said at least one of said equipments, said file corresponding to said file to be recovered;

generating, in said at least one of said equipments, data of a recovered file on the basis of contents of said file received from said transmission path.

16. A method of distributed file recovery according to claim 15, further comprising a step of:

receiving, in said at least one of said equipments, a current data related to said file to be recovered from said transmission path; and said generating step includes the step of generating data of said recovered file on the basis of said contents of said file received from said transmission path and said current data.

17. A method of distributed file recovery according to claim 15, wherein said current data is generated by any one of said equipments.

18. A method of distributed file recovery according to claim 15, wherein said file to be recovered is a file including historical data.

19. A method of distributed file recovery according to claim 15, wherein:

said file sending step includes the step of appending an identifier indicating a content of said file corresponding to said file to be recovered to said file corresponding to said file to be recovered; and said file receiving step includes the step of judging whether said corresponding file corresponds to said file to be recovered stored therein, and wherein said receiving step receives said corresponding file on the basis of a result of said judging.

* * * * *